United States Patent [19]
Baiyor et al.

[11] Patent Number: 6,005,930
[45] Date of Patent: *Dec. 21, 1999

[54] APPARATUS, METHOD AND SYSTEM FOR CONTROLLING SECONDARY TREATMENT BY A DISTANT SWITCH FOR MULTIPLE LEG TELECOMMUNICATION SESSIONS

[75] Inventors: Robert J. Baiyor; Deborah Thomas Earl, both of Naperville; Harold Robert Smith, Jr., Oakbrook Terrace; Thomas Dale Strom, Naperville, all of Ill.

[73] Assignee: Lucent Technologies Inc., Murray Hill, N.J.

[*] Notice: This patent is subject to a terminal disclaimer.

[21] Appl. No.: 09/097,334

[22] Filed: Jun. 15, 1998

[51] Int. Cl.$^6$ .............................. H04M 3/42; H04M 7/00; H04M 1/66; H04M 3/00
[52] U.S. Cl. .......................... 379/211; 379/202; 379/211; 379/219; 379/233; 379/199; 379/196
[58] Field of Search ..................................... 379/233, 219, 379/211, 202, 199, 196

[56] References Cited

U.S. PATENT DOCUMENTS

| | | | |
|---|---|---|---|
| 5,206,901 | 4/1993 | Harlow et al. | 379/211 |
| 5,802,160 | 9/1998 | Kugell et al. | 379/211 |

Primary Examiner—Krista Zele
Assistant Examiner—Bing Bui
Attorney, Agent, or Firm—Nancy R. Gamburd

[57] ABSTRACT

A system, apparatus and method are provided for controlling secondary treatment of multiple leg telecommunication sessions, such as for providing secondary treatment of outgoing call legs for a flexible alerting service, by an originating switch rather than a distant or terminating switch. The preferred system includes a home location register coupled to a mobile switching center. The home location register has, stored in a memory, a plurality of secondary directory numbers associated with a primary directory number, such as an ANSI compatible pilot directory number, and for each secondary directory number of the plurality of secondary directory numbers, further stored in the memory a corresponding originating no answer time parameter. The mobile switching center has an interface for receiving an incoming call leg designating the primary directory number and for differentially processing and routing each outgoing call leg associated with each secondary directory number, and the mobile switching center further providing secondary treatment of each outgoing call leg in accordance with its corresponding originating no answer time parameter. In the preferred embodiment, each corresponding originating no answer time parameter, for each outgoing call leg, is less than a corresponding terminating no answer time parameter which may be utilized by a terminating switch or end office.

40 Claims, 5 Drawing Sheets

APPARATUS, METHOD AND SYSTEM FOR CONTROLLING SECONDARY TREATMENT BY A DISTANT SWITCH FOR MULTIPLE LEG TELECOMMUNICATION SESSIONS

CROSS-REFERENCE TO RELATED APPLICATIONS

This application is related to Baiyor et al., U.S. patent application Ser. No. 09/094,837 entitled "Apparatus, Method And System For Controlling The Start Of Alerting Of Multiple Leg Telecommunication Sessions", filed concurrently herewith and commonly assigned to Lucent Technologies, Inc., and incorporated by reference herein, with priority claimed for all commonly disclosed subject matter (the "first related application").

This application also is related to Baiyor et al., U.S. patent application Ser. No. 09/094,527 entitled "Apparatus, Method And System For Providing Information to A Called Party In Multiple Leg Telecommunication Sessions", filed concurrently herewith and commonly assigned to Lucent Technologies, Inc., and incorporated by reference herein, with priority claimed for all commonly disclosed subject matter (the "second related application").

FIELD OF THE INVENTION

The present invention relates in general to telecommunication systems, and more particularly, to an apparatus, method and system for controlling secondary treatment by a distant switch for multiple leg telecommunication sessions.

BACKGROUND OF THE INVENTION

With the advent of increasingly sophisticated telecommunication services, various proposals have been made to allow a single call, incoming to a telecommunication switch, to branch into multiple, independent outgoing calls (or legs) to different called parties, during the same period of time. These incoming and multiple outgoing calls may be wireline, such as PSTN (public switched telephone network), ISDN (integrated services digital network), or T1/E1 wireline calls, or may be wireless, such as cellular calls or other mobile service communications.

Once such proposal is included in the ANSI-41 specification promulgated by the American National Standards Institute for wireless telecommunication, such as cellular communication, and is referred to as "flexible alerting". The ANSI-41 flexible alerting specification, however, does not include any specific directions or guidelines for implementation and control of such independent, concurrent outgoing multiple leg calls.

Other prior art systems also do not provide for multiple outgoing calls, to different parties, during the same time period. Rather, such known systems provide for individual, sequential calls rather than multiple, concurrent outgoing calls. For example, the incoming call may first alert a home telephone having a first directory number; if the first call is unanswered, that call leg is dropped and a second telephone having a different, second directory number is alerted, such as a cellular phone. If the second call is unanswered, that second call leg is dropped, and a third line having a third directory number is alerted, such as a pager.

In such flexible alerting or other systems having multiple, independent outgoing call legs from a single incoming call leg, whichever outgoing call leg is first to answer will receive the call and be connected to the calling party, with the other call legs being released (i.e., dropped or torn down, with their corresponding alerting ceased). In addition, the end units or terminating customer premise equipment (such as wireline telephones and wireless or mobile telephones) of the subscriber receiving the outgoing call legs preferably also receive direct calls in addition to such flexible alerting calls. A particular difficulty with such multiple outgoing call legs arises because such a subscriber or other customer may have different requirements for direct calls rather than flexible alerting calls. For example, a subscriber may want direct calls forwarded to a voice mail system when the line is busy, but may want an outgoing call leg of a flexible alerting session to be released on busy, so that the call may be answered by another member of the flexible alerting group. As a consequence, such flexible alerting calls may require different treatment than that afforded by a distant switch implementing various end unit services, such as voice mail or call forwarding services.

As a consequence, a need remains for an apparatus, method and system to implement and control multiple, independent outgoing communication sessions (or call legs) originating from a single incoming call leg. Such an apparatus, method and system should also provide for control of secondary treatment by a distant or terminating switch for the multiple, independent outgoing communication legs or links. Such an apparatus, method and system also should be user friendly and user transparent.

SUMMARY OF THE INVENTION

A system, apparatus and method are provided for controlling secondary treatment by a distant switch of multiple leg telecommunication sessions, such as for controlling secondary treatment of outgoing call legs for a flexible alerting service. The preferred system embodiment includes a home location register coupled to a mobile switching center. In the preferred system embodiment, a mobile switching center receives an incoming call leg designating a primary directory number ("DN"). A subscriber or other user of flexible alerting or other multi-leg communications, typically predefines a group of other directory numbers, referred to herein as secondary DNs, which are to be associated with the primary DN, such that when a call is placed to the primary DN, all of the secondary DNs are alerted. Such a list or grouping may be referred to as a flexible alerting group, or more broadly as an alerting group. The incoming call to the primary DN is then to be processed by a mobile switching center, which then directs the incoming call to the multiple different mobile or wireline secondary DNs of the user's predefined alerting group, creating multiple different outgoing communication legs to these differing and independent directory numbers. Whichever outgoing call leg is first to answer will receive the call and be connected to the calling party, with the other call legs released (i.e., dropped or torn down, with their corresponding alerting ceased).

A terminating switch or end office, involved in the routing or switching of an outgoing call leg to its final destination, in the prior art, typically may provide secondary treatment to all calls to a subscriber, such as providing voice mail or call forwarding of unanswered direct calls to a subscriber's directory number. For multiple leg communication sessions, however, different secondary treatment may be preferred. For example, rather than being transferred or forwarded to voice mail, an unanswered outgoing call leg may be released, enabling other alerting group members to answer their respective outgoing call legs instead. As a consequence, in accordance with the present invention, control over such secondary treatment of outgoing call legs of multiple leg communication sessions is maintained in the originating (or incoming call) switching center, rather than in the terminating switch or end office.

One of the preferred system embodiments for controlling secondary treatment of outgoing call legs for a flexible alerting service, includes a home location register and a mobile switching center. The home location register contains a plurality of secondary directory numbers associated with a pilot directory number, and for each secondary directory number, further has a corresponding originating no answer time parameter. The mobile switching center has an interface for receiving an incoming call leg designating the pilot directory number and for differentially processing and routing each outgoing call leg associated with each secondary directory number. The mobile switching center further provides secondary treatment of each outgoing call leg in accordance with its corresponding originating no answer time parameter. In the preferred embodiment, each corresponding originating no answer time parameter is less than a corresponding terminating no answer time parameter which may be utilized by a terminating switch or end office to, for example, forward an unanswered call to voice mail.

In the preferred embodiment, the corresponding originating no answer time parameter is contained as a parameter within a Termination List of a modified ANSI compatible LocationRequest RETURN RESULT.

Typically, the mobile switching center, when an outgoing call leg has been answered, connects the incoming call leg to the answered outgoing call leg and releases any remaining outgoing call legs. When an outgoing call leg has not been answered, and when a corresponding originating no answer time parameter has expired for an outgoing call leg, the mobile switching center releases the outgoing call leg before a terminating switch may perform any secondary treatment of the outgoing call leg. When the outgoing call leg has further instructions, the mobile switching center also performs the further instructions. In this way, when an outgoing call leg is unanswered, the originating switch maintains control over any secondary treatment to be afforded the outgoing call leg, in lieu of such control by a distant or terminating switch.

Numerous other advantages and features of the present invention will become readily apparent from the following detailed description of the invention and the embodiments thereof, from the claims and from the accompanying drawings.

DETAILED DESCRIPTION OF THE INVENTION

Figure 1:
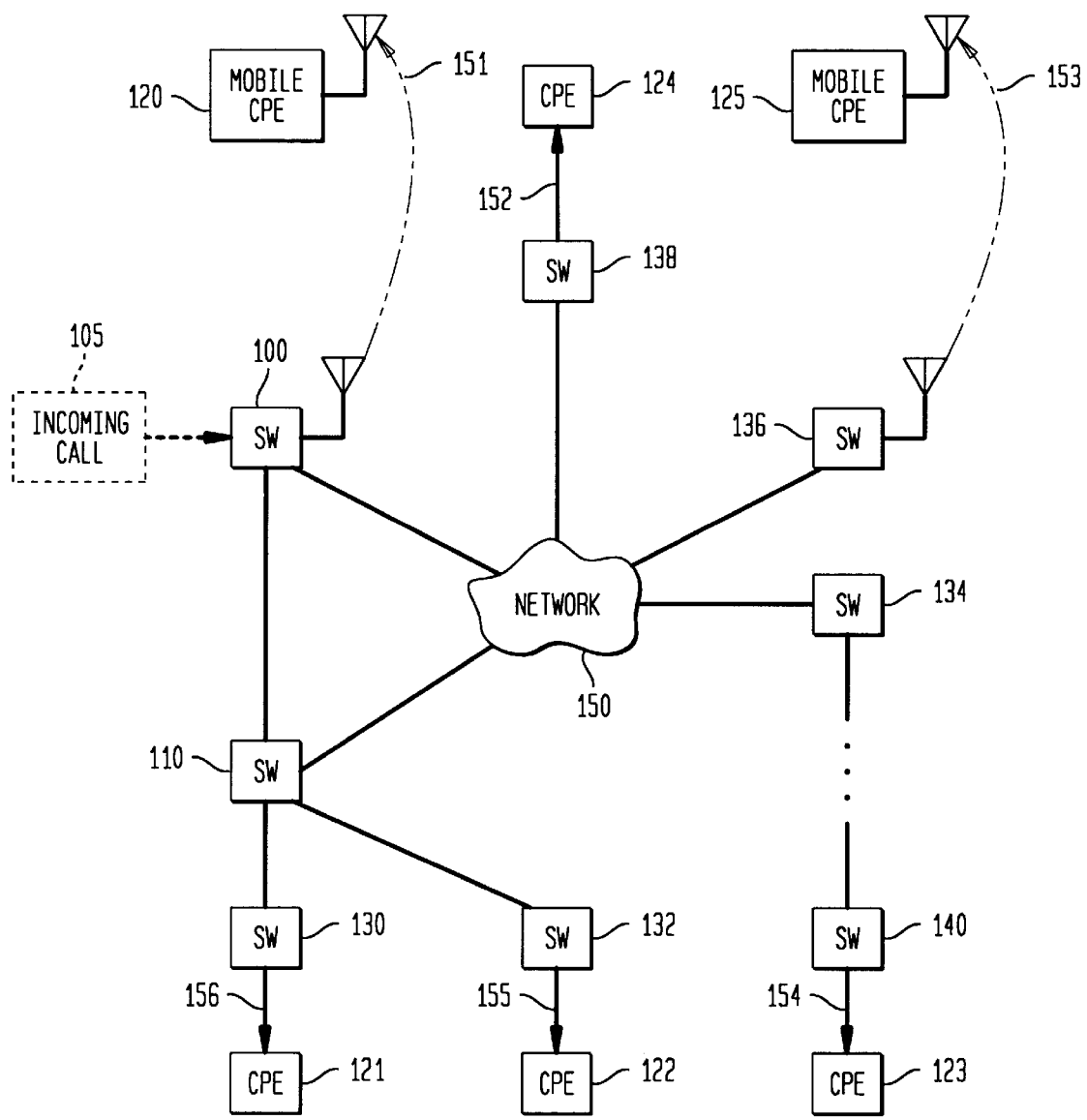
FIG. 1 is a block diagram illustrating controlling the secondary treatment by a distant switch of an outgoing call leg in accordance with the present invention.

As mentioned above, a need remains for an apparatus, method and system to implement and control multiple, independent outgoing communication sessions (or call legs) originating from a single call leg incoming to a telecommunication switch. In accordance with the present invention, an apparatus, method and system implement and control such multiple, independent outgoing communication sessions. More particularly, the apparatus, method and system in accordance with the present invention provide for control over the secondary treatment by a distant switch of these multiple, independent outgoing communication sessions. The apparatus, method and system of the present invention also are user friendly and user transparent.

As mentioned above, the new ANSI-41 specification provides a communications standard for flexible alerting for wireless communications, as a terminating feature or terminating call service. In this specification, a call is placed to a special directory number ("DN") referred to as a pilot directory number ("pilot DN") or as a primary directory number ("primary DN"). A subscriber or other user of flexible alerting or other multi-leg communications, typically predefines a group of other directory numbers, referred to herein as secondary DNs, which are to be associated with the pilot or primary DN, such that when a call is placed to the primary DN, all of the secondary DNs are alerted. Such a list or grouping may be referred to as a flexible alerting group, or more broadly as an alerting group or a secondary DN group, (and may also be referred to as a termination group or list when incorporated in certain response messages discussed below). The incoming call to the pilot DN is then to be processed by a mobile switch, which then directs the incoming call to the multiple different mobile or wireline secondary DNs of the user's predefined alerting group, creating multiple different outgoing communication legs to these differing and independent directory numbers. Whichever outgoing call leg is first to answer will receive the call and be connected to the calling party, with the other call legs released (i.e., dropped or torn down, with their corresponding alerting ceased).

Such flexible alerting or other multi-leg communication may be useful, for example, in businesses involving sales, repairs, or dispatching services. Such flexible alerting may also be useful for other business and personal uses, such as multiple calls to a home, office, and cellular telephone. For example, a child may call a single DN, namely, a parent's pilot DN, which will then alert the telephones at all the associated directory numbers or lines defined in the parent's alerting group or list, such as their home DN, business office DN, home office DN, and cellular or other mobile telephone DN. Presuming the parent is present, the parent will be alerted at any and all of these locations from the placement of a single telephone call.

As a consequence, for the purposes of the present invention, a person referred to as a called party, or more particularly, the customer premise equipment ("CPE") of the called party (such as a wireline or mobile telephone), may receive telecommunication calls in at least two different ways. First, the called party may receive calls directly via incoming calls placed to their directory number. Second, if their directory number is defined as a secondary DN in an alerting group, they may receive calls indirectly via incoming calls placed to the pilot DN (or primary DN) of the alerting group. The present invention is directed to controlling secondary call treatment by a distant (or terminating) network switch, to provide for potentially differing treatment for these two distinct types of calls. For example, for direct calls, a subscriber may want unanswered calls to be transferred or forwarded to voice mail (a type of secondary treatment) by the terminating switch (end office) providing service to the subscriber. Conversely, for indirect or flexible alerting calls, a subscriber may want unanswered calls to be answered by another member of the alerting group on a different outgoing call leg, and specifically does not want the unanswered call to be transferred to voice mail by the terminating end office or to be provided with any other secondary treatment. Because such secondary treatment of all received calls is generally controlled by a terminating end office (or switch), which is distant from the originating switch which received the incoming call leg, it is highly desirable, in accordance with the present invention, for the originating switch to directly retain and provide such control for these multiple, independent outgoing call legs, and remove such control of secondary treatment from the auspices of the distant or terminating switch.

The ANSI-41 specification, however, does not address the control of these multiple outgoing calls from an originating switch. Rather, the ANSI-41 specification merely addresses and requires that an incoming call to a pilot DN be routed to the associated, secondary DNs of the flexible alerting group, with the calling party ultimately connected to the answering party. The ANSI-41 specification does not address how each of these outgoing call legs should be controlled by an originating switch, especially in light of the potential secondary treatment afforded by a distant or terminating end office switch.

In accordance with the present invention, such control over secondary treatment of the multiple, independent outgoing call legs is retained by the originating switch (or switching center), i.e., the switch which received the incoming call leg, also referred to as an incoming call switch or switching center. In the preferred embodiment, such control is retained in two ways. First, in the event an outgoing call leg is unanswered after a predetermined period of time has elapsed, control of that outgoing call leg is returned to the originating switch. In such cases, for example, the outgoing call leg may be released by the originating switch before a terminating switch may forward it or transfer it to voice mail. For such control, in the preferred wireless system embodiment, a variable parameter referred to as a No Answer Time ("NAT") is utilized to specify this predetermined period of time, and to specifically do so on an individual outgoing call leg basis. In other circumstances, special instructions or other information may be provided to or among the various switches determining how such unanswered calls are to be handled, released or otherwise routed. For this second aspect of control, also in the preferred wireless system embodiment, a parameter referred to as "Termination Triggers" is also utilized on an individual outgoing call leg basis. As may become apparent from the following discussion, it is especially advantageous to retain such control on an individual, per leg basis for all outgoing call legs in accordance with the present invention.

FIG. 1 is a block diagram illustrating controlling the secondary treatment by a distant switch of an outgoing call leg in accordance with the present invention. As illustrated in FIG. 1, an incoming call leg 105 directed to a primary DN is received by switch 100, which is illustrated as a wireless switch in this example, but which also may be a wireline switch. Also as illustrated in FIG. 1, the incoming call leg 105 is directed to six outgoing call legs, as an example, corresponding to secondary DNs of an alerting group for the various illustrated end units referred to as customer premise equipment ("CPE"), such as mobile CPE 120, wireline CPE 121, wireline CPE 122, wireline CPE 123, wireline CPE 124, and mobile CPE 125. These various outgoing call legs may be routed through any number of wireline or wireless switches and networks, such as network 150, wireline switches 110 and 130 (for CPE 121), wireline switches 110 and 132 (for CPE 122), wireline switches 134 and 140 (for CPE 123), wireline switch 138 (for CPE 124), wireless switch 136 (for CPE 125), and through the same wireless switch 100 (for CPE 120). In addition to those switches illustrated, innumerable other switches or nodes, which may be any combination of PSTN, satellite, or wireless nodes or switches, may also be involved in such call routing, such as the switches or nodes generally included within the network 150.

Continuing to refer to FIG. 1, the incoming call leg 105, directed to a primary DN, has been directed or branched into multiple outgoing call legs corresponding to the associated secondary DNs predefined as part of a flexible alerting group; as illustrated, outgoing call legs 151, 152, 153, 154, 155, and 156. In the prior art, for secondary call treatment, each of these outgoing call legs would be under the control of each of their respective terminating switches 100, 138, 136, 140, 132, and 130. In accordance with the present invention, however, control of such secondary treatment is moved to an earlier network element, more particularly, to the originating or incoming call switch 100. (Also as discussed in greater detail below, such an originating switch 100 will also include or be connected to a database (such as a home location register) in the preferred embodiment).

For each outgoing call leg, such as outgoing call legs 151, 152, 153, 154, 155, and 156, in accordance with the present invention, the originating switch 100 establishes a time period during which that specific or designated outgoing call leg may be answered, referred to as a no answer time ("NAT") or an originating NAT. Each of these originating NAT periods is predetermined to be less (or shorter) than any corresponding time period utilized by the terminating switch or end office for secondary treatment of its corresponding CPE, referred to as a terminating no answer time or terminating NAT. As a consequence, before the expiration of such longer time periods utilized by the terminating switches, the shorter corresponding originating NATs will have expired, thereby returning or retaining control of secondary treatment to or in the originating switch 100. For example, if switch 140 would transfer an outgoing call to CPE 123 to voice mail within 26 seconds if unanswered, an originating NAT period for an outgoing call leg 154 to CPE 123 will be set at less than 26 seconds, such as at 25 seconds. If and when a corresponding call leg to this CPE 123 has not been answered before such a shorter time period (25 seconds) has elapsed or expired, the originating switch may release the outgoing call leg 154, preventing the terminating switch 140 from engaging in any secondary treatment of the call, such as preventing forwarding or transferring of the call. Such secondary treatment would have occurred only upon the expiration of the longer time period (terminating NAT) which, given that the call has been released at the earlier time, cannot or should not occur.

Similar originating NAT periods are established on an individual basis for each of the other outgoing call legs, which will be similarly treated if and when they remain unanswered and their corresponding originating NAT periods expire. For example, if the terminating no answer time for switch 136 is 17 seconds, an originating NAT for outgoing call leg 153 will be set to less than 17 seconds, and if the terminating no answer time for switch 132 is 23 seconds, an originating NAT for outgoing call leg 155 will be set to less than 23 seconds, and so on. In addition, as discussed in greater detail below, upon the expiration of such originating NAT periods, other types of secondary treatment may be performed by the originating switch 100, in addition to the release of the particular outgoing call leg.

As a consequence, in accordance with the present invention, control over the secondary treatment of these independent, multiple leg calls has been removed from a terminating switch or end office, and has been retained by an earlier network element, in this case, the originating switch or originating switching center. The present invention utilizes a no answer time parameter, to individually and independently control any secondary processing of each outgoing leg of the multiple outgoing legs. The originating no answer time parameter of the present invention, which is both variable and independent for each individual outgoing call leg, is not provided in and is wholly independent of the ANSI-41 specification or any other telecommunications standard or specification. Rather, the ANSI-41 specification provides for one general or global no answer time parameter only for application to the entire group of outgoing call legs as a whole, which does not provide the type of control of the present invention. As a consequence, use of this new parameter in a wireless system would modify and be independent of the current ANSI-41 specification. This new originating NAT parameter is also independent of any particular network embodiment, and may be utilized to control the secondary treatment of outgoing call legs of any type, including wireline or wireless.

Indeed, use of the ANSI-type of global no answer time parameter may be highly problematic for providing appropriate control of secondary treatment of outgoing call legs, as each such outgoing call leg is subject to a different and highly variable terminating no answer time parameter. In order to utilize such a global parameter, it would have to be set as shorter or smaller than the smallest terminating no answer time of all of the outgoing call legs of the alerting group. Each of these outgoing call legs, however, has a different and highly variable time period for processing and routing, especially if additional routing instructions (such as temporary local DNs ("TLDNs")) are provided by a serving MSC 315 (FIG. 3), as discussed in the first related application. If alerting of all such calls is not reasonably concurrent, a no answer time for an outgoing call leg which had been routed promptly may expire before another call leg has had sufficient alerting or has even been routed, completely defeating the purpose of flexible alerting. As a consequence, while use of a global NAT may be appropriate for other ANSI-41 purposes, such use is inappropriate and undesirable for providing the individual control of secondary treatment of each outgoing call leg in accordance with the present invention.

In accordance with the present invention, the establishment or determination of each individual originating NAT, for each outgoing call leg, may be primarily administrative or empirical. A particular service provider may have reasonable knowledge concerning the various terminating NATs when establishing a flexible alerting or other multi-leg communication service, and therefore may establish the corresponding individual originating NATs, on a per leg basis, during the initial setup of the alerting group. Under other circumstances, such terminating NATs may be determined through empirical testing, with corresponding individual originating NATs, on a per leg basis, set accordingly.

The various originating NAT parameters may also be varied based upon actual usage and subscriber feedback. For example, a particular subscriber may find that his or her terminating switch routes an unanswered outgoing call leg to voice mail, rather than the originating switch releasing the leg or providing other forms of secondary treatment (discussed below). In that event, the corresponding originating NAT parameter may need to be decreased. Conversely, a particular subscriber may find that his or her outgoing call legs are being released too soon, such as before the person can respond to the alerting of the outgoing call leg. In that event, the corresponding originating NAT parameter may need to be increased.

Figure 2:
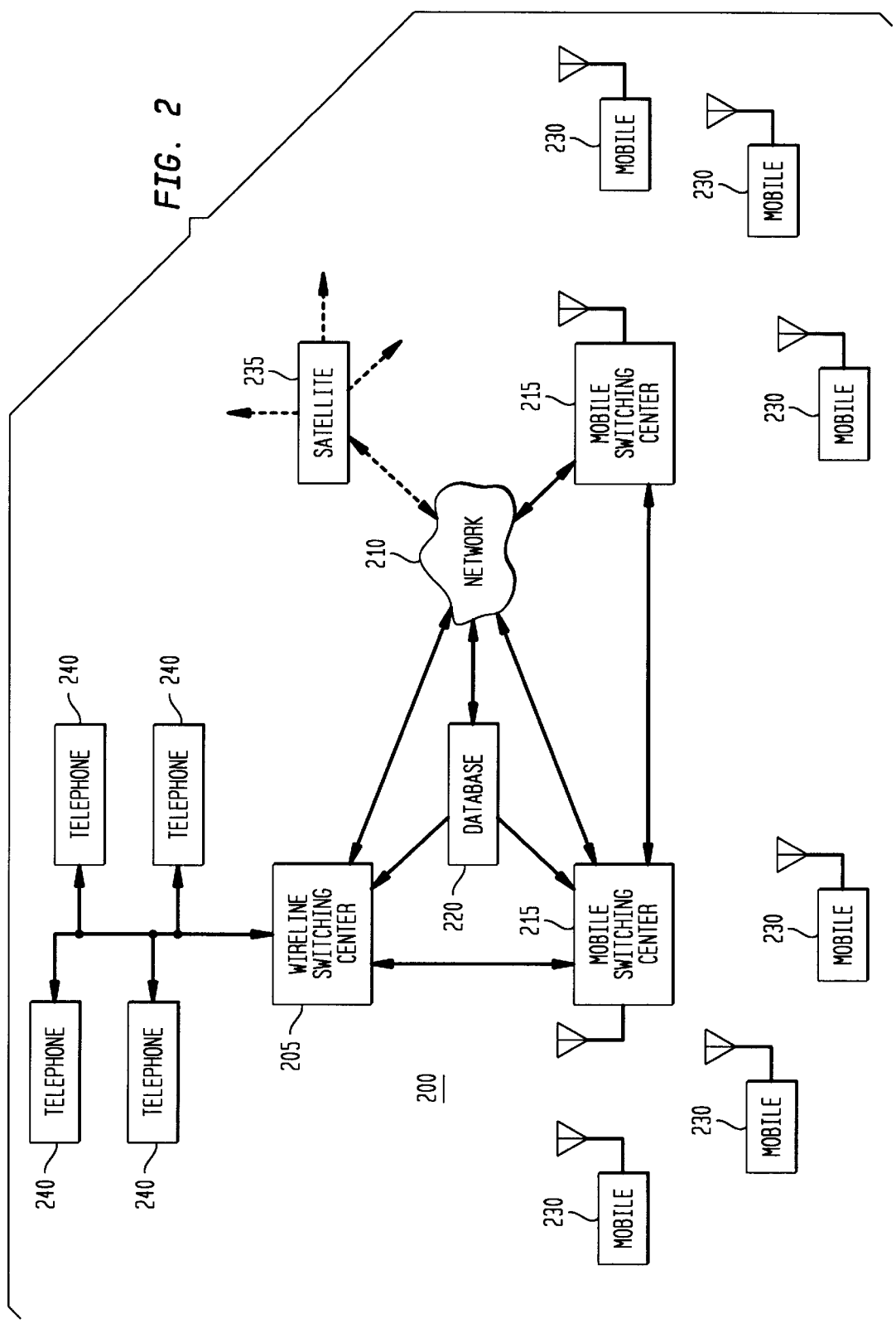
FIG. 2 is a block diagram illustrating a first system embodiment in accordance with the present invention.

FIG. 2 is a block diagram illustrating a first system embodiment 200 in accordance with the present invention. The system 200 includes one or more mobile switching centers ("MSCs") 215 and one or more wireline switching centers 205, which may also be connected via trunk and signaling lines to each other and to a broader network 210, such as a PSTN or ISDN network providing multiple telecommunication connections to other locations, such as providing a link to satellite 235. The system 200 also includes a database 220, which is preferably connected or coupled to a wireline switching center 205 and to a MSC 215. A database 220 may also be directly included or integrated within the various switching centers 205 and 215. The wireline switching center 205 is also generally connected to a plurality of telephones 240 or other customer premise equipment, while the MSCs 215 typically have a wireless link to the various mobile units 230, such as cellular telephones within a particular geographic region. In addition, while the wireline and mobile switching centers 205 and 215 are usually physically separated due to regulatory and other historical reasons, these switching centers may also be combined into one or more switching centers having both wireline and wireless functionalities.

Continuing to refer to FIG. 2, an incoming call directed to a primary DN may be received by either the wireline switching center 205 or one of the mobile switching centers 215. The switching center 205 or 215 then transmits a request to database 220 for an alerting list containing the secondary directory numbers associated with the primary or pilot DN (such as a termination list). In accordance with the present invention, the database 220 transmits a response to the corresponding switching center 205 or 215, containing or listing both the associated DNs and their corresponding NAT parameters (one for each associated DN). The switching center 205 or 215 begins the processing and routing of the associated outgoing call legs (with such processing and routing of each outgoing call leg delayed according to its corresponding timing delay parameter, to provide approximately concurrent alerting as described in the first related application). For each outgoing call leg, the switching center 205 or 215 monitors the call leg and its associated originating NAT. If one of the outgoing call legs is answered, the incoming call leg is connected to the answering outgoing call leg, and the remaining outgoing call legs are released. During this process, if any one of the individual originating NATs expires, that corresponding outgoing call leg may be released, or as discussed below, may be subject to other instructions. Additional details of operation of the system 200 are discussed in greater detail below.

Figure 3:
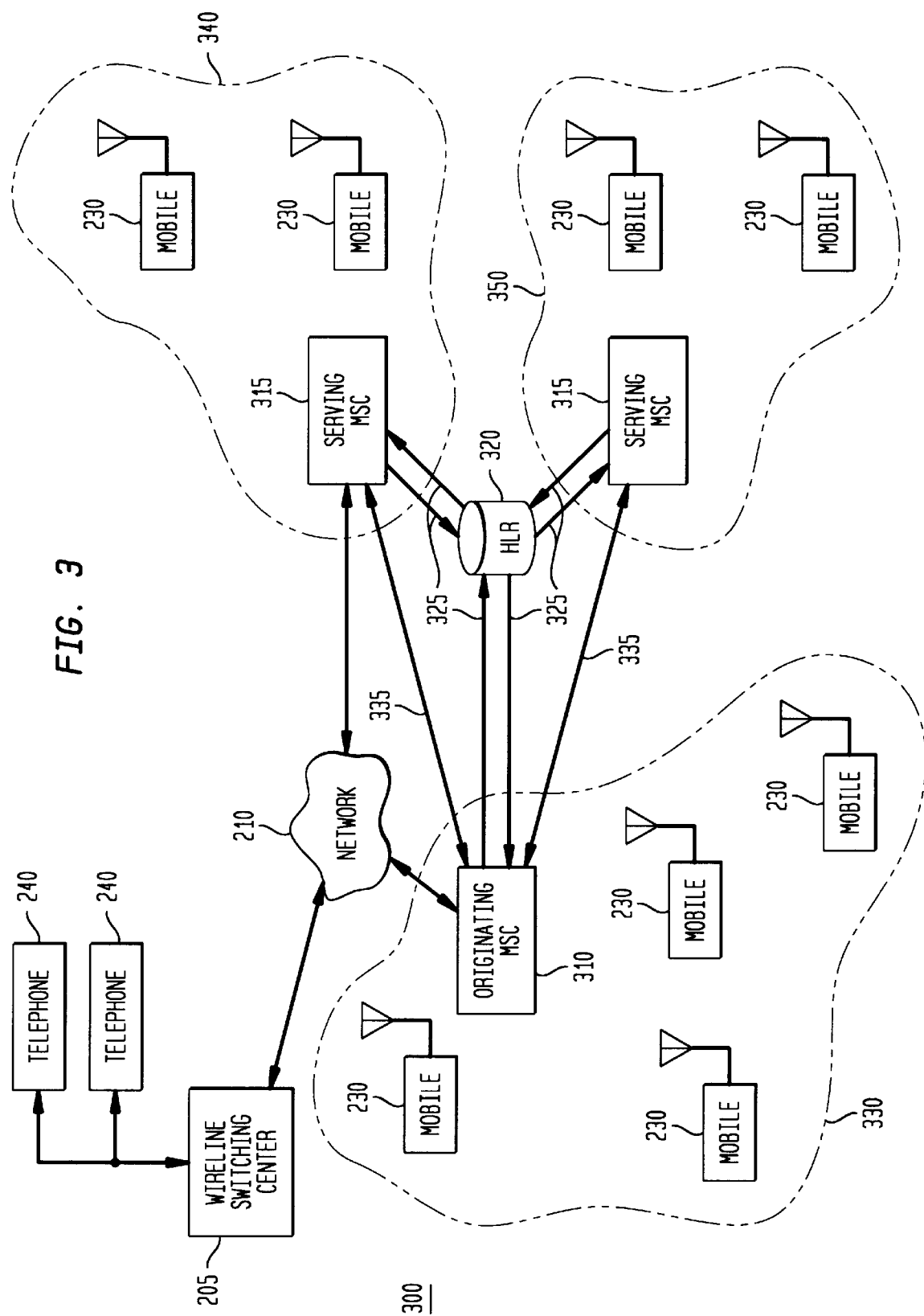
FIG. 3 is a block diagram illustrating a second system embodiment for wireless communication in accordance with the present invention.

FIG. 3 is a block diagram illustrating a second, preferred system embodiment 300 for wireless communication in accordance with the present invention, such as for ANSI-41 flexible alerting. In this system 300, the mobile switching centers 215 are represented by two types of MSCs. The first type of MSC, referred to as an originating MSC 310, directly provides service to the mobile units 230 within its designated or predetermined geographic region 330. The second type of MSC, referred to as a serving MSCs 315, provides service to mobile units 230 which have traveled or roamed into their designated or predetermined geographic regions 340 and 350. A stand-alone home location register ("HLR") 320 is utilized in this preferred embodiment, among other things, to implement the database 220 and other ANSI-41 signaling functionality. The various MSCs 310 and 315 are preferably connected to the HLR 320 via ANSI-41 signaling interfaces and corresponding links 325. As in the system of FIG. 2, the various MSCs 310 and 315 are also connected or coupled to a wireline switching center 205 and to a network 210, for multiple network connections, such as PSTN, ISDN, or satellite connections.

Continuing to refer to FIG. 3, when an originating MSC 310 receives an incoming call to or otherwise designating a pilot DN or other primary directory number, the originating MSC 310 transmits a query or other message to an HLR 320. Such a query is typically in the form of a data packet, and includes a reference to the pilot DN or other primary DN. While the operation of the system 300 is explained with reference to an originating MSC 310, it should be understood that any MSC 215, at any given time, may be serving as either or both an originating MSC 310 or a serving MSC 315. The incoming call to the originating MSC 310 may be a wireless call, from one of the mobile units 230, or may be a wireline call originating from the network 210, such as a PSTN call. In the preferred embodiment, utilizing the ANSI-41 specification, the query transmitted by the originating MSC 310 to the HLR 320 is a "LocationRequest", which is an operation used by an originating MSC 310 to obtain call treatment instructions from the HLR 320, and is initiated with a "TCAP INVOKE (LAST), carried by a TCAP QUERY WITH PERMISSION package, and includes corresponding mandatory and optional parameters as defined in the ANSI-41 specification for a LocationRequest INVOKE, such as pilot DN, billing identification, and originating MSC identifier.

Utilizing its database, the HLR 320 first determines whether the pilot or primary DN is for a flexible alerting group or other multi-leg communications group, and if so, prepares a response or other message containing the secondary DNs (of the user's or subscriber's defined alerting group), and further containing their corresponding originating NAT parameters, in accordance with the present invention. In addition, in this response message, the HLR 320 may also provide instructions concerning how unanswered outgoing call legs should be handled. For an ANSI-41 implementation, such instructions are referred to as Termination Triggers, discussed in greater detail below. The HLR 320 then transmits, back to the originating MSC 310, a response data packet having a listing of secondary DNs with each of their corresponding originating NAT parameters, along with other possible instructions such as termination triggers. In the preferred embodiment, NAT parameter values are designated in one second increments, utilizing an 8 bit parameter, from zero to 255 seconds.

The originating MSC 310, utilizing the information contained in the response data packet (the listing of secondary DNs and each of their corresponding originating NAT parameters), begins the processing and routing of each outgoing call leg to each secondary DN, with such processing and routing delayed according to each secondary DN's respective timing delay parameter, to provide concurrent alerting (approximately) for all of these secondary DNs in accordance with the invention disclosed in the first related application. If and when one of these outgoing call legs is answered, the originating MSC 310 connects the calling party (incoming leg) to that answered outgoing leg, followed by releasing the remaining outgoing legs and ceasing their alerting.

In the event that an originating NAT parameter expires for one of the outgoing call legs prior to such answering, that (expired) outgoing call legs may be treated in a variety of ways. The various outgoing call legs may also be unanswered for a variety of reasons, with signaling information potentially returned to the originating MSC 310 prior to the expiration of the corresponding originating NAT parameter. For example, a particular outgoing call leg may be directed toward a CPE, such as a mobile 230, which is busy, having initiated its own call. As mentioned above, that outgoing call leg having the expired or elapsed originating NAT parameter, or which has returned other signaling information (such as a busy signal) may be released or torn down by the originating MSC 310, depending upon instructions received (such as Termination Triggers). In addition to or in lieu of releasing such an outgoing call leg, also depending upon the particular instructions received (e.g., as a Termination Trigger), the originating MSC 310 may query the HLR 320 for further instructions concerning how that particular outgoing call leg should be addressed or otherwise handled. For example, if one of the outgoing call legs is to be routed to a TLDN (temporary local DN) provided by a serving MSC 315, when the corresponding outgoing call leg is actually routed, intervening events may have occurred. For example, a roaming mobile unit 230 may be busy, having initiated its own outgoing call, or a no page response may be returned. In that event, the roaming mobile unit 230 may have call forwarding on busy, resulting in the serving MSC 315 sending a redirect request to the originating MSC 310. In turn, the originating MSC 310 may then query the HLR 320 for further instructions concerning that particular outgoing call leg.

As a consequence, in accordance with the present invention, control of secondary treatment of outgoing call legs is retained in two ways. First, prior to the expiration of a corresponding originating NAT parameter, other signaling information or other instructions (such as termination triggers) may indicate a particular secondary treatment by the originating MSC 310, such as outgoing call leg redirection on busy. Second, any unanswered outgoing call leg may time out depending upon its corresponding originating NAT parameter. In either event, control of secondary treatment of the outgoing call leg is retained by the originating MSC 310, and not the distant or terminating switch.

The originating NAT parameters may also be implemented into a system 200 or 300 in a variety of ways. For example, initial values may be programmed into an HLR 320 or other database 220 by a service provider during the initial programming establishing the subscriber's alerting group. These values may also be varied over time by, for example, dynamic calculations by a processor (FIG. 4) within the HLR 320 prior to responding to the originating MSC 310 with the listing of secondary DNs and corresponding NAT parameters. In addition, a user interface may be provided for a subscriber to personally vary these values, for example, through an interactive voice or keypad menu. Once established and properly functioning to provide appropriate control over secondary treatment, (or as close an approximation thereto as may be reasonably achieved), the originating NAT parameters, for any given secondary DN and its potential locations (such as home and different roaming areas), may remain relatively static.

In addition, the values for the NAT parameters may have two different forms in the preferred embodiment. The values discussed above have been relative time delay parameters, providing an increment or period of time relative to terminating no answer parameters. Values for originating NAT parameters may also be expressed in an absolute form, such as 10:43:02 a.m., 10:43:04 a.m., and so on, thereby also providing the desired control over secondary treatment for the various outgoing call legs.

As mentioned above, in the preferred embodiment, a location query from an originating MSC 310 to an HLR 320 is a data packet in accordance with the ANSI-41 specifications for a LocationRequest. Conversely, however, there is no provision within the ANSI-41 specification for an HLR 320 to transmit an individual originating NAT parameter on a per outgoing call leg basis, in accordance with the present invention, to an MSC 310. In addition, in the preferred embodiment of system 300, as mentioned above, the originating NAT parameter values are transmitted as 8 bit values. As a consequence, in the preferred embodiment, the list of secondary DNs associated with a primary DN, and their corresponding originating NAT parameter values, are transmitted as a data packet from the HLR 320 to the originating MSC 310 having a modified ANSI-41 format.

More particularly, the individual NAT parameter values are defined, in accordance with the present invention, as a parameter which is used in a new way independently of or modifying ANSI-41, whereby this information (secondary DNs and corresponding NAT parameter values), is transmitted by an HLR to an originating MSC within a "TerminationList" ANSI parameter of a "LocationRequest RETURN RESULT" ("LRRR") operation, reported with a TCAP RETURN RESULT (LAST) and carried in a TCAP RESPONSE package. Within the TerminationList parameter, there are three sub-parameters utilized in the present invention for designation of secondary DNs, namely, PSTN terminations, local terminations, and intersystem terminations. In turn, within each of these sub-parameters, a NAT parameter value is included for each secondary DN, as a new use of a NAT parameter, along with other ANSI parameters (such as a digits parameter). Other instructions, such as to release an outgoing call leg or to query the HLR 320 for further instructions, as indicated above, are included within the ANSI-41 TerminationTriggers, which is a parameter on the same level as a TerminationList parameter. Innumerable other formats, fields or parameters transmitting such control of secondary treatment information may also be utilized without departing from the spirit and scope of the present invention.

Figure 4:
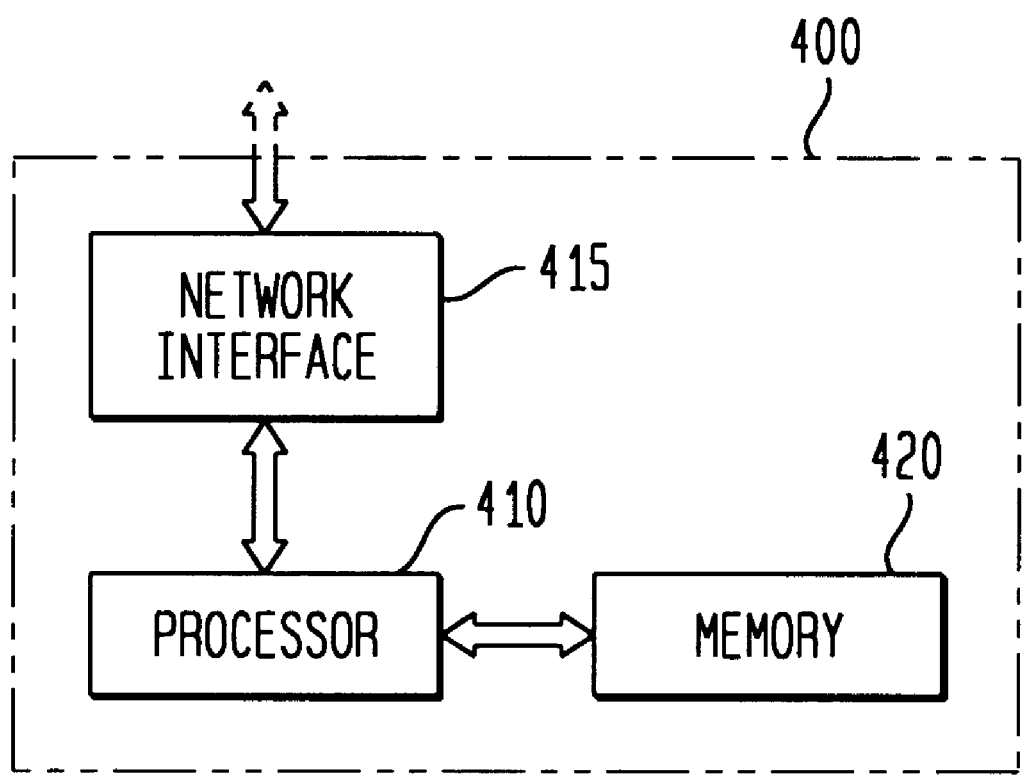
FIG. 4 is a block diagram illustrating an apparatus embodiment in accordance with the present invention.

FIG. 4 is a block diagram illustrating an apparatus embodiment 400 in accordance with the present invention. As discussed in greater detail below, such an apparatus 400 may be included within, or distributed among, an MSC (310 or 315) or HLR 320 of a system 300, or may be included within, or distributed among, a switching center 205 or 215 and database 220 of system 200. The apparatus 400 includes a processor 410, a network interface 415, and a memory 420. The network interface 415 is utilized to receive an incoming call leg to a pilot DN or primary DN, and to transmit the plurality of outgoing call legs to the secondary DNs associated with a primary DN. For example, in system 300, the network interface 415 may be couplable to the network 210 (via a trunk and signaling line) for transmission and reception of PSTN calls, and couplable to an antenna for transmission and reception of wireless calls. The memory 420 may be a magnetic hard drive, an optical storage device, or any other type of data storage apparatus. The memory 420 is used to store information pertaining to primary DNs, such as all associated secondary DNs and their NAT parameters, and other call placement and routing information. The memory 420 performs such information storage comparable to the information storage of the database 220 or HLR 320.

Continuing to refer to FIG. 4, the processor 410 may include a single integrated circuit ("IC"), or may include a plurality of integrated circuits or other components connected, arranged or grouped together, such as microprocessors, digital signal processors ("DSPs"), application specific integrated circuits ("ASICs"), associated memory (such as RAM and ROM), and other ICs and components. As a consequence, as used herein, the term processor should be understood to equivalently mean and include a single processor, or arrangement of processors, microprocessors, controllers, or some other grouping of integrated circuits which perform the functions discussed above and also discussed in detail below with reference to FIG. 5, with associated memory, such as microprocessor memory or additional RAM, ROM, EPROM or $E^2$PROM. The methodology of the invention, as discussed above with reference to FIGS. 1, 2 and 3 and as discussed below with reference to FIG. 5, may be programmed and stored, in the processor 410 with its associated memory and other equivalent components, as a set of program instructions for subsequent execution when the processor 410 is operative (i.e., powered on and functioning).

As mentioned above, such an apparatus 400 may be included within, or distributed among, an MSC (310 or 315) or HLR 320 of a system 300, or may be included within, or distributed among, switching centers 205 or 215 and database 220 of system 200. For example, when included within the system 200, the various switching centers 205 and 215 may incorporate the database 220; in that event, the apparatus 400 may be completely included within either the wireline switching center 205 or the wireless switching center 215. Also for example, when included within the system 300, the apparatus 400 may distributed among the originating MSC 310 and the HLR 320, with the memory 420 incorporated within the HLR 320, with the processor 410 having components within the originating MSC 310 and the HLR 320, and with the network interface 415 incorporated within the MSC 310 (or 315). In such a distributed embodiment for the system 300, the apparatus 400 would also include corresponding ANSI-41 signaling interfaces within the originating MSC 310 and the HLR 320, for communication of the various requests and responses discussed above.

In summary, the apparatus 400 for concurrent alerting of multiple leg telecommunication sessions, includes, first a network interface 415 for reception of an incoming call leg designating a primary directory number and for transmission of an outgoing call leg; second, a memory 420 having a plurality of secondary directory numbers associated with the primary directory number, and for each secondary directory number of the plurality of secondary directory numbers, further having a corresponding no answer time parameter; and third, a processor 410 coupled to the memory and the network interface. The processor, when operative, includes program instructions to differentially process and route each outgoing call leg associated with each secondary directory number, of the plurality of secondary directory numbers, and to provide secondary treatment according to its corresponding no answer time parameter.

Figure 5:
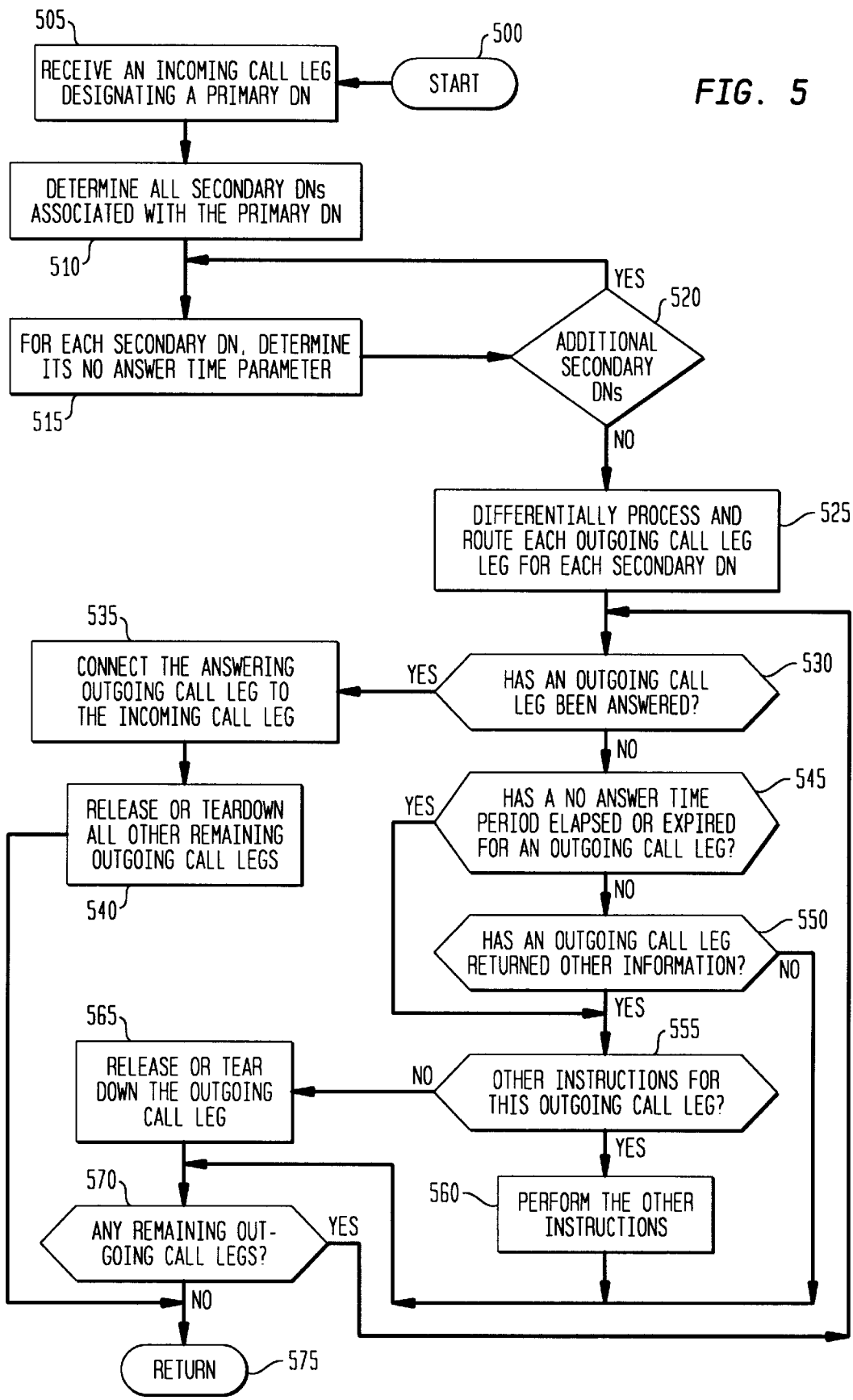
FIG. 5 is a flow diagram illustrating a method embodiment in accordance with the present invention.

FIG. 5 is a flow diagram illustrating a method embodiment in accordance with the present invention. Beginning with start step 500, the method begins with the reception of an incoming call leg designating a primary DN, step 505, such as a pilot DN of the ANSI-41 specification. Next, in step 510, the method determines all secondary DNs associated with the primary DN. As indicated above, this is usually performed in the preferred embodiment through a query to the HLR 320, such as an ANSI-41 LocationRequest. Following step 510, for each secondary DN, the method determines a corresponding originating no answer time parameter, step 515, which is also preferably stored in the HLR 320. Next, in step 520, the method determines whether there are more secondary DNs remaining which require determination of corresponding originating NAT parameters, and if so, the method returns to step 515 to determine these originating NAT parameters. The method continues to repeat steps 515 and 520 until all secondary DNs (associated with the primary DN) have corresponding originating NAT parameters. When all such secondary DNs have corresponding originating NAT parameters in step 520, the method proceeds to differentially process and route each outgoing call leg to each secondary DN, step 525, as discussed in greater detail in the first related application.

Following such differential processing and routing in step 525, the method monitors each outgoing call leg. First, in step 530, the method determines whether any outgoing call leg has been answered. When an outgoing call leg has been answered in step 530, the method proceeds to connect the incoming call leg to the answering outgoing call leg, step 535, and then releases or tears down all other remaining outgoing call legs, step 540, and the method may end, return step 575. When no outgoing call legs have been answered in step 530, the method proceeds to the second step of monitoring, namely, determining whether an originating NAT period has elapsed or expired for any given or particular outgoing call leg, step 545. When an originating NAT period has elapsed or expired for a particular outgoing call leg in step 545, the method proceeds to step 555, discussed below. When an originating NAT period has not elapsed or expired for any given or particular outgoing call leg in step 545, the method proceeds to the third step of monitoring, namely, determining whether an outgoing call leg has returned other information, step 550, such as a busy signal, a redirect signal, or a no page response signal. When an outgoing call leg has returned other information in step 550, the method proceeds to step 555, also discussed below. When no outgoing call leg has returned other information in step 550, the method determines whether there are any remaining outgoing call legs, step 570. When there are any remaining outgoing call legs in step 570, the method returns to step 530, to continue to monitor each remaining outgoing call leg for answering (step 530), for expiration of its originating NAT parameter (step 545), and for return of other information (step 550). When there are no more remaining outgoing call legs in step 570, the method may end, return step 575.

As indicated above, when an originating NAT period has elapsed or expired for a particular outgoing call leg in step 545, or when an outgoing call leg has returned other information in step 550, the method proceeds to step 555. In step 555, the method determines whether there are other instructions for this particular outgoing leg, such as instructions to reroute the outgoing call leg or to release the outgoing call leg, such as instructions contained in a termination trigger parameter. When there are other instructions for this particular outgoing call leg in step 555, the method performs those other instructions, step 560. When there are not other instructions for this particular outgoing call leg in step 555, the method releases or tears down that particular outgoing call leg, step 565. Following steps 560 and 565, the method proceeds to step 570, to determine whether there are any remaining outgoing call legs, as discussed above.

As may be apparent from the above discussion, the system, apparatus and method of the present invention provide significant advantages. First, in accordance with the present invention, control of the secondary treatment of all outgoing call legs is retained by the originating (or incoming call) switch or switching center. As a consequence, use of the present invention avoids the problems which may arise in flexible alerting groups, in which one outgoing call leg may be forwarded or answered by voice mail, rather than released for other outgoing call legs to be answered by another alerting group member. The use of the present invention results in a more efficient allocation of resources, both of the consumer and of the service provider. Use of the present invention avoids potential consumer irritation and dissatisfaction which may arise if and when an outgoing call leg may be erroneously forwarded or answered by voice mail, rather than being answered by another alerting group member. In addition, the apparatus, method and system of the present invention also are user friendly, with the secondary treatment methodology occurring transparently to a user and within a system embodiment.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method for an originating outgoing call leg switch to control secondary treatment of multiple leg telecommunication sessions, the method comprising:

(a) receiving an incoming call leg designating a primary directory number;

(b) determining a plurality of secondary directory numbers associated with the primary directory number;

(c) for each secondary directory number of the plurality of secondary directory numbers, determining a corresponding originating no answer time parameter;

(d) processing and routing each outgoing call leg associated with each secondary directory number; and (e) providing secondary treatment of each outgoing call leg in accordance with its corresponding originating no answer time parameter.

2. The method of claim 1, further comprising:

when an outgoing call leg has been answered, connecting the incoming call leg to the answered outgoing call leg and releasing any remaining outgoing call legs.

3. The method of claim 1, wherein each corresponding originating no answer time parameter is less than a corresponding terminating no answer time parameter.

4. The method of claim 1, wherein step (e) further comprises:

when a corresponding originating no answer time parameter has expired for an outgoing call leg, releasing the outgoing call leg.

5. The method of claim 1, wherein step (e) further comprises:

when a corresponding originating no answer time parameter has expired for an outgoing call leg, and when the outgoing call leg has further instructions, performing the further instructions.

6. The method of claim 5, wherein performing the further instructions includes rerouting the outgoing call leg.

7. The method of claim 1, further comprising:

when an outgoing call leg has returned further instructions prior to an expiration of its corresponding originating no answer time parameter, releasing the outgoing call leg.

8. The method of claim 1, further comprising:
when an outgoing call leg has returned further instructions prior to an expiration of its corresponding originating no answer time parameter, performing the further instructions.

9. The method of claim 1, wherein step (c) further comprises:
transmitting a LocationRequest RETURN RESULT containing, for each secondary directory number of the plurality of secondary directory numbers, the corresponding originating no answer time parameter.

10. The method of claim 1 wherein the corresponding originating no answer time parameter is contained as a parameter within a Termination List of a modified ANSI compatible LocationRequest RETURN RESULT.

11. A system for an originating outgoing call leg switch to control secondary treatment of multiple leg telecommunication sessions, the system comprising:
a database, the database having stored in a memory a plurality of secondary directory numbers associated with a primary directory number, and for each secondary directory number of the plurality of secondary directory numbers, further storing in the memory a corresponding originating no answer time parameter; and
a switching center coupled to the database, the switching center further having an interface for receiving an incoming call leg designating the primary directory number and for differentially processing and routing each outgoing call leg associated with each secondary directory number, and the switching center further providing secondary treatment of each outgoing call leg in accordance with its corresponding originating no answer time parameter.

12. The system of claim 11, wherein the switching center, when an outgoing call leg has been answered, connects the incoming call leg to the answered outgoing call leg and releases any remaining outgoing call legs.

13. The system of claim 11, wherein each corresponding originating no answer time parameter is less than a corresponding terminating no answer time parameter.

14. The system of claim 11, wherein the switching center, when a corresponding originating no answer time parameter has expired for an outgoing call leg, releases the outgoing call leg.

15. The system of claim 11, wherein the switching center, when a corresponding originating no answer time parameter has expired for an outgoing call leg, and when the outgoing call leg has further instructions, performs the further instructions.

16. The system of claim 15, wherein performing the further instructions includes rerouting the outgoing call leg.

17. The system of claim 11, wherein the switching center, when an outgoing call leg has returned further instructions prior to an expiration of its corresponding originating no answer time parameter, releases the outgoing call leg.

18. The system of claim 11, wherein the switching center, when an outgoing call leg has returned further instructions prior to an expiration of its corresponding originating no answer time parameter, performs the further instructions.

19. The system of claim 11, wherein the database transmits to the switching center a LocationRequest RETURN RESULT containing, for each secondary directory number of the plurality of secondary directory numbers, the corresponding originating no answer time parameter.

20. The system of claim 11 wherein the corresponding originating no answer time parameter is contained as a parameter within a Termination List of a modified ANSI compatible LocationRequest RETURN RESULT.

21. The system of claim 11, wherein the database is a home location register.

22. The system of claim 11 wherein the switching center is a mobile switching center.

23. An apparatus for an originating outgoing call leg switch to control secondary treatment of multiple leg telecommunication sessions, the apparatus comprising:
a network interface for reception of an incoming call leg designating a primary directory number and for transmission of an outgoing call leg;
a memory having a plurality of secondary directory numbers associated with the primary directory number, and for each secondary directory number of the plurality of secondary directory numbers, further having a corresponding originating no answer time parameter; and
a processor coupled to the memory and the network interface, wherein the processor, when operative, includes program instructions to differentially process and route each outgoing call leg associated with each secondary directory number, and to provide secondary treatment of each outgoing call leg in accordance with its corresponding originating no answer time parameter.

24. The apparatus of claim 23, wherein the processor includes further program instructions, when an outgoing call leg has been answered, to connect the incoming call leg to the answered outgoing call leg and releases any remaining outgoing call legs.

25. The apparatus of claim 23, wherein each corresponding originating no answer time parameter is less than a corresponding terminating no answer time parameter.

26. The apparatus of claim 23, wherein the processor includes further program instructions, when a corresponding originating no answer time parameter has expired for an outgoing call leg, to release the outgoing call leg.

27. The apparatus of claim 23, wherein the processor includes further program instructions, when a corresponding originating no answer time parameter has expired for an outgoing call leg, and when the outgoing call leg has further instructions, to performs the further instructions.

28. The apparatus of claim 27, wherein the performance of the further instructions includes the processor rerouting the outgoing call leg.

29. The apparatus of claim 23, wherein the processor includes further program instructions, when an outgoing call leg has returned further instructions prior to an expiration of its corresponding originating no answer time parameter, to release the outgoing call leg.

30. The apparatus of claim 23, wherein the processor includes further program instructions, when an outgoing call leg has returned further instructions prior to an expiration of its corresponding originating no answer time parameter, to perform the further instructions.

31. A system for an originating outgoing call leg switch to control secondary treatment of outgoing call legs for flexible alerting service, the system comprising:
a home location register, the home location register having stored in a memory a plurality of secondary directory numbers associated with a pilot directory number, and for each secondary directory number of the plurality of secondary directory numbers, further storing in the memory a corresponding originating no answer time parameter; and
a mobile switching center coupled to the home location register, the mobile switching center further having an interface for receiving an incoming call leg designating the pilot directory number and for differentially processing and routing each outgoing call leg associated with each secondary directory number, of the plurality of secondary directory numbers, and the mobile switching center further providing secondary treatment of each outgoing call leg in accordance with its corresponding originating no answer time parameter.

32. The system of claim 31, wherein the mobile switching center, when an outgoing call leg has been answered, connects the incoming call leg to the answered outgoing call leg and releases any remaining outgoing call legs.

33. The system of claim 31, wherein each corresponding originating no answer time parameter is less than a corresponding terminating no answer time parameter.

34. The system of claim 31, wherein the mobile switching center, when a corresponding originating no answer time parameter has expired for an outgoing call leg, releases the outgoing call leg.

35. The system of claim 31, wherein the mobile switching center, when a corresponding originating no answer time parameter has expired for an outgoing call leg, and when the outgoing call leg has further instructions, performs the further instructions.

36. The system of claim 35, wherein performing the further instructions includes rerouting the outgoing call leg.

37. The system of claim 31, wherein the switching center, when an outgoing call leg has returned further instructions prior to an expiration of its corresponding originating no answer time parameter, releases the outgoing call leg.

38. The system of claim 31, wherein the switching center, when an outgoing call leg has returned further instructions prior to an expiration of its corresponding originating no answer time parameter, performs the further instructions.

39. The system of claim 31, wherein the home location register transmits to the mobile switching center a LocationRequest RETURN RESULT containing, for each secondary directory number of the plurality of secondary directory numbers, the corresponding originating no answer time parameter.

40. The system of claim 31 wherein the corresponding originating no answer time parameter is contained as a parameter within a Termination List of a modified ANSI compatible LocationRequest RETURN RESULT.

* * * * *